(12) United States Patent
Han et al.

(10) Patent No.: US 12,493,814 B2
(45) Date of Patent: Dec. 9, 2025

(54) PERMANENT DEFECT QUBIT REPAIR SYSTEM AND METHOD USING BUILT-IN-SELF-REPAIR MODEL AT QUANTUM CIRCUIT LEVEL

(71) Applicant: PUKYONG NATIONAL UNIVERSITY INDUSTRY-UNIVERSITY COOPERATION FOUNDATION, Busan (KR)

(72) Inventors: Youngsun Han, Seongnam-si (KR); Dongmin Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 27 days.

(21) Appl. No.: 18/664,870

(22) Filed: May 15, 2024

(65) Prior Publication Data
US 2025/0285000 A1     Sep. 11, 2025

(30) Foreign Application Priority Data
Mar. 7, 2024   (KR) ........................ 10-2024-0032627

(51) Int. Cl.
  *G01R 31/28*   (2006.01)
  *G06N 10/40*   (2022.01)
  *G06N 10/70*   (2022.01)
(52) U.S. Cl.
  CPC ............. *G06N 10/70* (2022.01); *G06N 10/40* (2022.01)

(58) Field of Classification Search
  CPC ........ G06N 10/70; G06N 10/60; H03M 13/47
  See application file for complete search history.

(56) References Cited

U.S. PATENT DOCUMENTS

| 7,875,876 | B1 * | 1/2011 | Wandzura | ............... G06N 10/40 |
| | | | | 257/26 |
| 9,767,924 | B1 * | 9/2017 | Bhargava | ........... G11C 29/4401 |
| 9,858,531 | B1 * | 1/2018 | Monroe | ................. G06N 10/40 |
| 10,872,021 | B1 * | 12/2020 | Tezak | .................... G06F 11/273 |

(Continued)

FOREIGN PATENT DOCUMENTS

| KR | 10-2011-0010381 A | 2/2011 |
| KR | 10-2015-0130888 A | 11/2015 |
| KR | 10-2018-0138216 A | 12/2018 |

*Primary Examiner* — Esaw T Abraham
(74) *Attorney, Agent, or Firm* — Paratus Law Group, PLLC

(57) ABSTRACT

A permanent defect qubit repair system using a redundant repair circuit at a quantum circuit level, includes: automatic test equipment configured to provide a fault address table with information of a permanent fault address (FA) and a spare address (SA) for replacing the FA to a quantum memory; a redundant repair circuit configured to constitute a circuit to repair a permanent defect qubit consisting of an address comparison and address replacement process and transfer an updated memory address to an address routing circuit; and the quantum memory comprising the address routing circuit configured to receive the updated memory address from the redundant repair circuit and then route the updated memory address to a memory cell according to an address value.

15 Claims, 6 Drawing Sheets

(56) References Cited

U.S. PATENT DOCUMENTS

| | | | |
|---|---|---|---|
| 10,971,247 B2* | 4/2021 | Kim | G11C 29/781 |
| 11,651,831 B2* | 5/2023 | Lim | G11C 29/76 |
| | | | 714/718 |
| 12,210,932 B2* | 1/2025 | Gamble, IV | G06N 10/00 |
| 2021/0166777 A1* | 6/2021 | Shen | G11C 29/38 |
| 2022/0011958 A1* | 1/2022 | Anderson | G06F 3/0638 |

\* cited by examiner

| Qubit | | State | | | |
|---|---|---|---|---|---|
| | | $a_1$ | | $a_2$ | |
| $\|c\rangle$ | $\|t\rangle$ | $\|c\rangle$ | $\|t\rangle$ | $\|c\rangle$ | $\|t\rangle$ |
| 0 | 0 | 0 | 0 | 0 | 1 |
| 0 | 1 | 0 | 1 | 0 | 0 |
| 1 | 0 | 1 | 1 | 1 | 1 |
| 1 | 1 | 1 | 0 | 1 | 0 |

PERMANENT DEFECT QUBIT REPAIR SYSTEM AND METHOD USING BUILT-IN-SELF-REPAIR MODEL AT QUANTUM CIRCUIT LEVEL

CROSS-REFERENCE TO RELATED APPLICATION

This application claims priority to Korean Patent Application No. 10-2024-0032627 (filed on Mar. 7, 2024), which is hereby incorporated by reference in its entirety.

ACKNOWLEDGEMENT

This research was supported by an Institute for Information & Communications Technology Planning & Evaluation (IITP) grant funded by the Korean government (MSIT; Grant No. 2020-0-00014, "A Technology Development of Quantum OS for Fault-tolerant Logical Qubit Computing Environment").

BACKGROUND

The present disclosure relates to quantum fault correction, and more particularly, to a permanent defect qubit repair system and method using a built-in-self-repair model at a quantum circuit level to increase quantum memory yield by providing an alternative memory qubit allocation system for permanent defect qubits generated during a quantum memory production process.

As research on quantum computing is progressing in various ways at domestic and foreign companies, the development of high-level quantum software using a large number of qubits is also actively underway.

In order to run high-level quantum software, quantum memory technology with sufficient memory space is also essential.

Just as the conventional memory used in classical computers develops permanent defects in some areas during the process, quantum memory also generates unusable qubits during the process.

Quantum memory plays the role of storing state values so that the volatile quantum information transferred by photons is not lost. An ideal quantum memory emits photons in the same quantum state as the stored quantum information so that the user may obtain the corresponding quantum information at the desired time.

Since quantum memory also utilizes qubits, it uses quantum gates that change the state of the qubit. At this time, there is a problem that undesirable state changes occur during operations due to inherent errors in qubits and quantum gates.

A quantum fault correction process is essential to alleviate the quantum fault problem of qubits and quantum gates.

In the related art, quantum fault correction that may occur during routing is performed by performing a quantum fault correction process on the quantum gate required during routing using the bucket brigade method. By correcting faults in the quantum gates used in the routing process, it is possible to build a system that may tolerate a certain level of fault.

However, if the memory qubit used in the decoding process is unavailable, the meaning of fault correction disappears. In addition, the overhead in terms of the number of additional qubits and quantum gates used for fault correction is also significant.

Therefore, there is a need for analysis of permanent faults and routing and decoding methods to replace them.

PRIOR-ART DOCUMENTS

Patent Documents (Patent Document 1) Korean Patent Application Publication No. 10-2018-0138216
(Patent Document 2) Korean Patent Application Publication No. 10-2015-0130888
(Patent Document 3) Korean Patent Application Publication No. 10-2011-0010381

SUMMARY

The present disclosure is intended to solve the problems of quantum fault correction technology of the related art, and an object is to provide a permanent defect qubit repair system and method using a built-in-self-repair model at a quantum circuit level to increase quantum memory yield by providing an alternative memory qubit allocation system for permanent defect qubits generated during the quantum memory production process.

An object of the present disclosure is to provide a permanent defect qubit repair system and method using a built-in-self-repair model at a quantum circuit level to significantly reduce overhead in terms of added qubits by performing quantum fault correction by configuring a built-in-self-repair model (quantum oracle) based on fault address table information, instead of a quantum fault correction process that requires a large number of additional qubits at the same time.

An object of the present disclosure is to provide a permanent defect qubit repair system and method using a built-in-self-repair model at a quantum circuit level that enables efficient permanent defect qubit repair by activating a flag qubit through the built-in-self-repair model when an input address is received, routing un updated memory address value according to a value of the flag qubit through a routing circuit, and determining whether to read or write a value to the memory according to an R/W value and ultimately accessing the value of a memory cell that is not defective.

Other objects of the present disclosure are not limited to the objects mentioned above, and other objects not mentioned will be clearly understood by those skilled in the art from the description below.

A permanent defect qubit repair system using a built-in-self-repair model (hereinafter, also referred to as a redundant repair circuit) at a quantum circuit level according to the present disclosure to achieve the above objects includes, automatic test equipment configured to provide a fault address table with information of a permanent fault address (FA) and a spare address (SA) for replacing the FA to a quantum memory; a redundant repair circuit configured to constitute a circuit to repair a permanent defect qubit consisting of an address comparison and address replacement process and transfer an updated memory address to an address routing circuit; and the quantum memory including the address routing circuit configured to receive the updated memory address from the redundant repair circuit and then route the updated memory address to a memory cell according to an address value.

Here, the redundant repair circuit may include an address comparator and an address exchanger supported by a quantum oracle to constitute the circuit to repair the permanent defect qubit consisting of the address comparison and address replacement process, and the quantum oracle may use FA information and SA information to constitute a relationship with an input address.

In addition, the quantum memory may further include a read/write circuit configured to read a value in the memory cell or store a value in the memory cell according to a state of the read/write circuit receiving input data and associated with the memory cell.

In addition, the memory cell may consist of original memory qubits and spare memory qubits to allow routing to the spare memory qubits if a first input address has been an FA, and according to a state of a read/write circuit afterwards, values stored in the memory cell may be read or input data may be stored in the memory cell.

In addition, the number of addresses of the FA and the number of addresses of the SA for replacing the FA of the fault address table may be the same and they may correspond 1 to 1.

In addition, an address comparator of the redundant repair circuit may be configured to perform a comparison with the information of the FA reflected in a quantum oracle, and an activation of a repair flag may be determined according to a result thereof, wherein the repair flag may be transferred to an address exchanger, and the address exchanger may be configured to update a value of an input address to transfer an address to be routed to the address routing circuit.

In addition, the address routing circuit may have a tree structure, wherein each node consists of qubits, and may be divided into a subtree for routing original memory qubits at top of the tree and a subtree for routing spare memory qubits.

In addition, quantum gates for constituting the quantum oracle for supporting the redundant repair circuit may be Controlled-Not and Anti-Controlled-Not gates, and gate inputs |c> and |t> may be a control qubit and a target qubit, respectively.

In addition, updates at time points a1 and a2 may be made according to initial states of the control qubit and the target qubit, and a Controlled-Not operation may invert a state of the target qubit when a state of the control qubit is |1>, and an Anti-Controlled-Not operation may invert the state of the target qubit when the state of the control qubit is |0>.

In addition, the redundant repair circuit may be configured such that an input address, the FA, and the SA can be associated using the Controlled-Not operation and the Anti-Controlled-Not operation, so that, when the input address is given as input to the memory, the quantum oracle performs a comparison with all FAs by a single circuit execution and outputs a corresponding SA.

In addition, the redundant repair circuit may be configured to receive an RFQ qubit and a |1> qubit that perform a repair flag function as additional inputs in order to perform a role of an address exchanger, a state of the RFQ qubit may be initialized to |0> and inverted to a state of |1> in order to activate a spare qubit routing circuit, and if the state of the RFQ after the address exchanger is |0>, an original qubit routing circuit may be activated.

In addition, the original qubit routing circuit and the spare qubit routing circuit may be both circuits configured to receive the updated memory address as input for routing to the original memory qubit and the spare memory qubit, respectively, and each circuit may be a sub-tree structure with RFQ and |1> as top nodes.

In addition, the read/write circuit may be associated through quantum operations between components of Data Qubit (DQ), Readout, R/W, and C, and qubits constituting the address routing circuit, wherein DQ is a qubit storing input data, Readout is a qubit for reading values stored in the memory, R/W is a qubit for determining read and write operations, and C is a bit storing a value after measurement.

In addition, the read/write circuit may be configured to perform a role of reading and writing according to a state of R/W, and when a value of R/W is |1>, perform memory writing and store a value stored in DQ in the value of the routed memory cell, and conversely, when the value of R/W is |0>, measure the value of the routed memory cell for memory reading through the Readout qubit and transfer a measured value to C.

A permanent defect qubit repair method using a redundant repair circuit at a quantum circuit level according to the present disclosure to achieve another object includes, receiving, by a quantum memory, a fault address table (FAT) from automatic test equipment (ATE) and inputting an input address into a redundant repair circuit; inputting input data into a read/write circuit of the quantum memory; performing permanent defect qubit repair consisting of an address comparison and address replacement process, by the redundant repair circuit of the quantum memory; transferring an updated memory address to an address routing circuit; accessing a location of an original memory qubit or a spare memory qubit of a memory cell using the updated memory address in the address routing circuit; and according to a state of the read/write circuit, storing the input data in a routed memory qubit or outputting a value stored in a memory qubit.

The permanent defect qubit repair system and method using a built-in-self-repair model at a quantum circuit level according to the present disclosure as described above has the following effects.

First, it provides an alternative memory qubit allocation system for permanent defect qubits generated during the quantum memory production process, thereby increasing quantum memory yield.

Second, instead of a quantum fault correction process that requires a large number of additional qubits at the same time, quantum fault correction may be performed by configuring a built-in-self-repair model (quantum oracle) based on fault address table information, thereby significantly reducing the overhead in terms of added qubits.

Third, a flag qubit is activated through the built-in-self-repair model when an input address is received, an updated memory address value is routed according to a value of the flag qubit through a routing circuit, and it is determined whether to read or write a value to the memory according to an R/W value to ultimately access the value of a memory cell that is not defective, thereby allowing efficient permanent defect qubit repair.

DETAILED DESCRIPTION

Hereinafter, preferred embodiments of a permanent defect qubit repair system and method using a built-in-self-repair model at a quantum circuit level according to the present disclosure will be described in detail as follows.

The features and advantages of the permanent defect qubit repair system and method using a built-in-self-repair model at a quantum circuit level according to the present disclosure will become apparent through the detailed description of each embodiment below.

Figure 1:
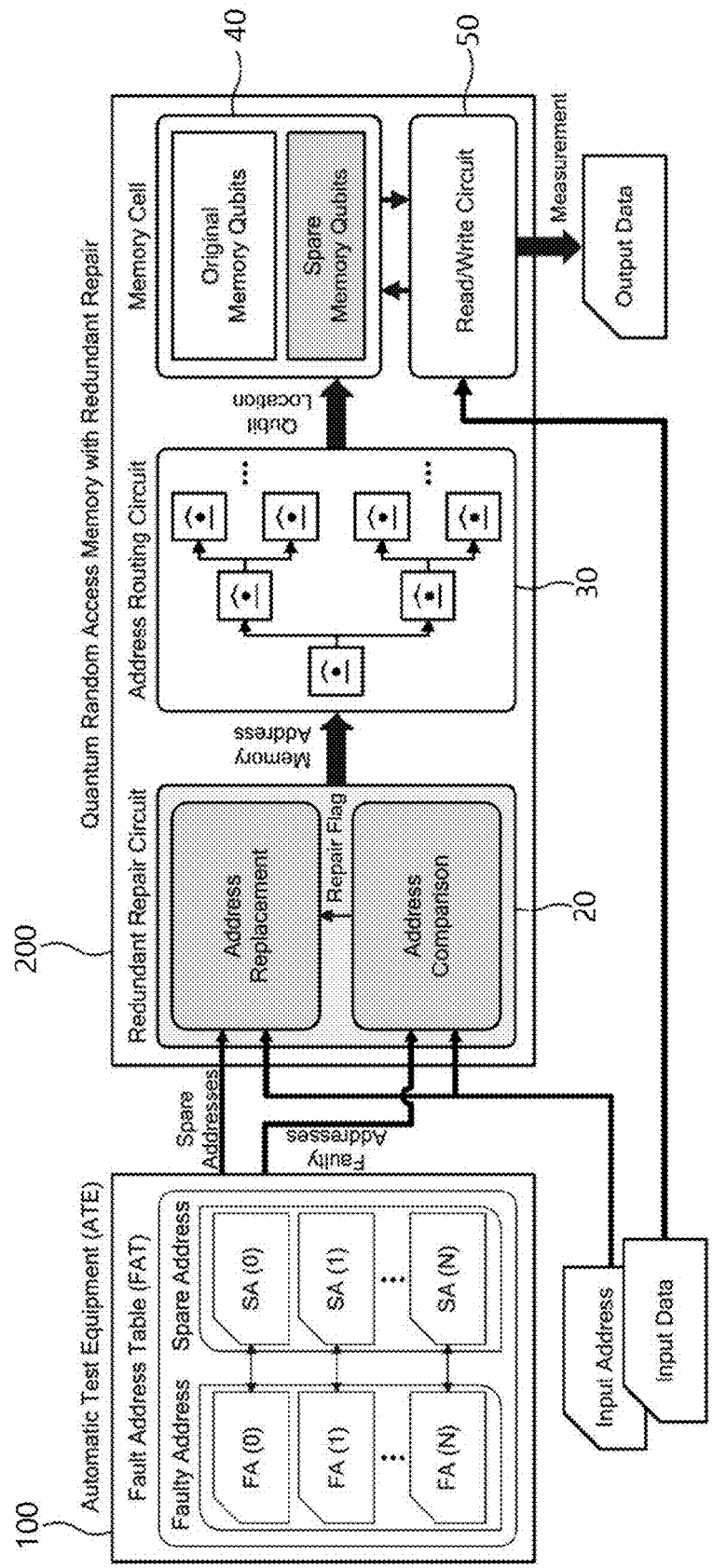
FIG. 1 is a block diagram of a permanent defect qubit repair system using a built-in-self-repair model at a quantum circuit level according to the present disclosure.

FIG. 1 is a block diagram of a permanent defect qubit repair system using a built-in-self-repair model at a quantum circuit level according to the present disclosure.

General terms that are currently widely used as much as possible have been selected as terms used in the present disclosure while considering the functions in the present disclosure, but this may vary depending on the intention of those skilled in the art, precedents, the emergence of new technologies, and the like. In addition, in certain cases, there are terms arbitrarily selected by the applicant, and in this case, the meaning will be described in detail in relevant parts of the detailed description. Therefore, the terms used in the present disclosure should be defined based on the meaning of the term and the overall content of the present disclosure, rather than simply the name of the term.

Throughout the specification, when a part "includes" a certain component, this means that it does not exclude other components but may additionally include other components, unless specifically stated to the contrary. In addition, terms such as "part", "module", etc., as used herein refer to a unit that processes at least one function or operation, which may be implemented as hardware or software, or as a combination of hardware and software.

The permanent defect qubit repair system and method using a built-in-self-repair model at a quantum circuit level according to the present disclosure are intended to increase quantum memory yield by providing a replacement memory qubit allocation system for permanent defect qubits generated during the quantum memory production process.

In order to significantly reduce overhead in terms of added qubits, the present disclosure may include a configuration that performs quantum fault correction by configuring a built-in-self-repair model (quantum oracle) based on fault table information, instead of a quantum fault correction process that additionally requires a large number of qubits at the same time.

In order to enable efficient permanent defect qubit repair, the present disclosure may include a configuration in which a flag qubit is activated through the built-in-self-repair model when an input address is received, and the updated memory address value according to the value of the flag qubit is routed through a routing circuit, and determines whether to read or write a value to the memory according to the R/W value and ultimately accesses the value of a memory cell in which no defect has occurred.

In the permanent defect qubit repair system using a built-in-self-repair model at a quantum circuit level according to the present disclosure, as shown in FIG. 1, quantum memory 200 uses a fault address table 10 containing information on a permanent fault address (FA) input from automatic test equipment 100 and a spare address (SA) to replace it as input to the built-in-self-repair model.

A built-in-self-repair model 20 of the quantum memory 200 includes an address comparator and an address exchanger supported by a quantum oracle, and constitutes a circuit to repair a permanent defect qubit consisting of an address comparison and address replacement process, and the quantum oracle uses FA information and SA information to constitute a relationship with an input address.

Here, a quantum oracle is a component used in quantum computing to process information and solve a given problem.

Depending on the specific problem, quantum oracles are supported, allowing the benefits of quantum computers to be maximized by leveraging the superposition and entanglement of quantum states.

In the permanent defect qubit repair system using a built-in-self-repair model at a quantum circuit level according to the present disclosure, the quantum memory 200 receives a fault address table (FAT), an input address, and input data from the automatic test equipment (ATE) 100 as input.

The input data is given as an input to a read/write circuit 50 of the quantum memory 200.

The FAT 10 has information on the FA and SA.

The built-in-self-repair model 20 of the quantum memory 200 constitutes a circuit to repair the permanent defect qubit consisting of the address comparison and address replacement process, and then transfers the updated memory address to an address routing circuit 30.

The address routing circuit 30 uses the updated memory address to access the location of the original memory qubit or spare memory qubit of the memory cell 40, and afterwards, stores the input data in the routed memory qubit (write) or outputs (read) the value stored in the memory qubit according to the state of the read/write circuit 50.

Specifically, the permanent defect qubit repair system using a built-in-self-repair model at a quantum circuit level according to the present disclosure includes ATE 100 configured to provide an FAT 10 with information of a permanent FA and a SA for replacing the FA to quantum memory 200, a built-in-self-repair model 20 configured to constitute a circuit to repair a permanent defect qubit consisting of an address comparison and address replacement process, and configured to transfer an updated memory address to an address routing circuit 30, and the quantum memory 200 including the address routing circuit 30 configured to receive the updated memory address from the built-in-self-repair model 20 and then route the updated memory address to a memory cell 40 according to an address value.

Here, the quantum memory 200 further includes a read/write circuit 50 configured to read a value in the memory cell 40 or store a value in the memory cell 40, according to the state of the read/write circuit 40 receiving input data and associated with the memory cell 40.

In addition, the memory cell 40 consists of original memory qubits and spare memory qubits to allow routing to the spare memory qubits if a first input address has been an FA, and wherein according to a state of the read/write circuit 50 afterwards, values stored in the memory cell are read or input data is stored in the memory cell 40.

In addition, the FAT 10 provided by the ATE 100 has information on the permanent FA and SA to replace it, and the number of each address is the same and they correspond 1 to 1.

Then, in the built-in-self-repair model (the redundant repair circuit) 20 address comparator, comparison with the FA information reflected in the quantum oracle is performed, and activation of the repair flag is determined according to the result.

The repair flag is transferred to the address exchanger, and the address exchanger updates the value of the input address and transfers the address to be routed to the address routing circuit.

In addition, the address routing circuit 30 has a tree structure wherein each node consists of qubits, and is divided into a subtree for routing original memory qubits at top of the tree and a subtree for routing spare memory qubits.

Figure 2:
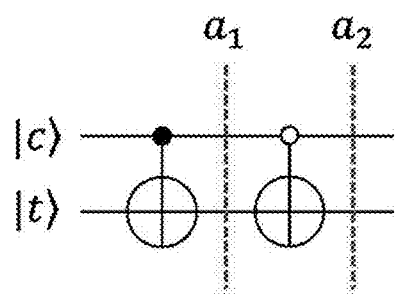
FIG. 2 is a quantum gate configuration diagram for configuring a quantum oracle according to an embodiment of the present disclosure.

FIG. 2 is a quantum gate configuration diagram for configuring a quantum oracle for supporting a redundant repair circuit according to an embodiment of the present disclosure.

The quantum gates used in the circuit are Controlled-Not and Anti-Controlled-Not gates, and |c> and |t> are a control qubit and a target qubit, respectively.

The table on the right of FIG. 2 shows updated states at time points a1 and a2 according to initial states of the control qubit and target qubit.

In a Controlled-Not operation, the state of the target qubit is inverted when the state of the control qubit is |1>, but in an Anti-Controlled-Not operation, the state of the target qubit is inverted when the state of the control qubit is |0>.

The built-in-self-repair model 20 is configured such that the input address, FA, and SA can be associated using these operations, and through this, when the input address is given as input to the memory, the quantum oracle performs a comparison with all FAs by a single circuit execution and outputs the corresponding SA.

Figure 3:
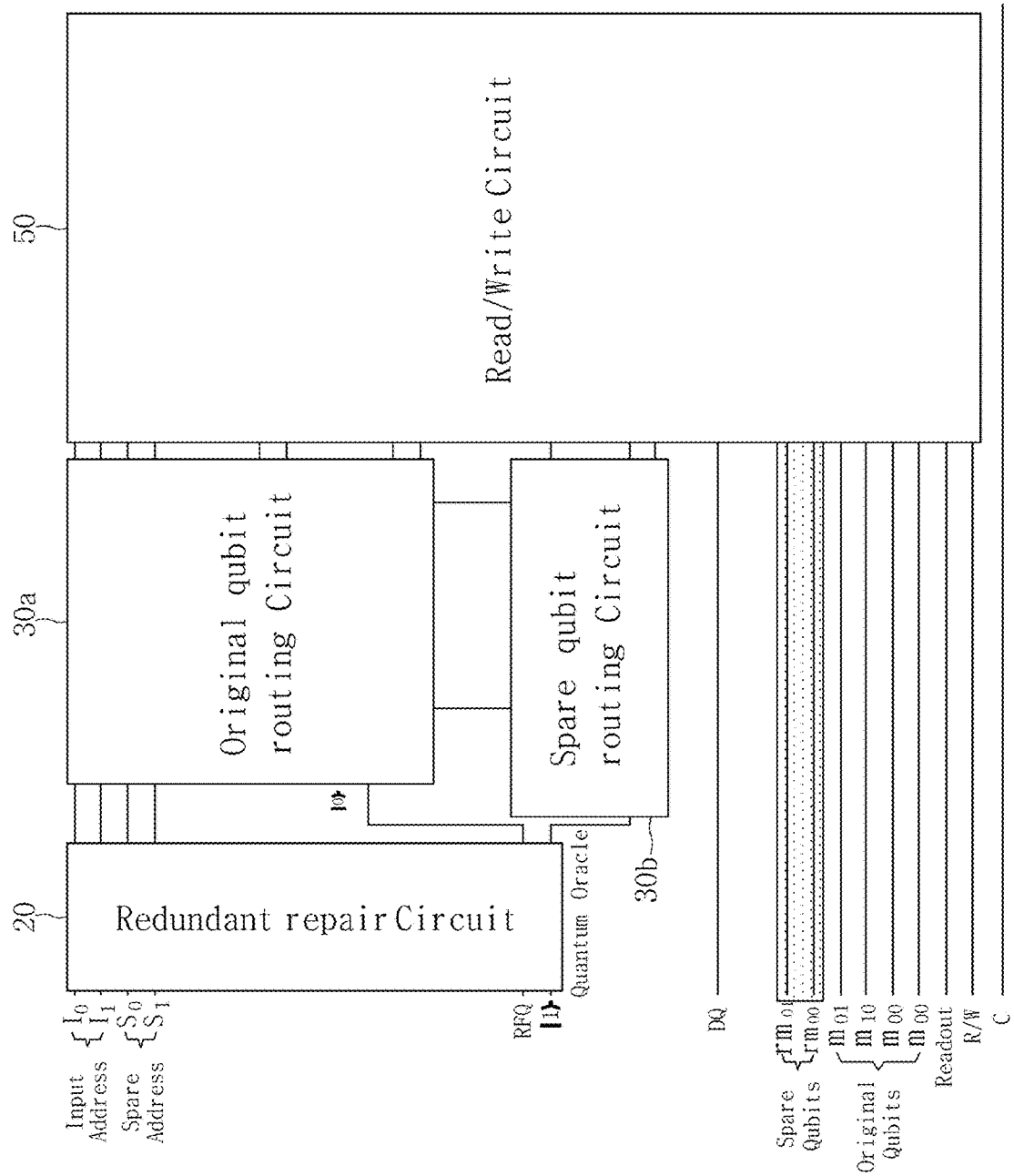
FIG. 3 is a detailed configuration diagram of a permanent defect qubit repair system using a built-in-self-repair model at a quantum circuit level according to the present disclosure.
Figure 4:
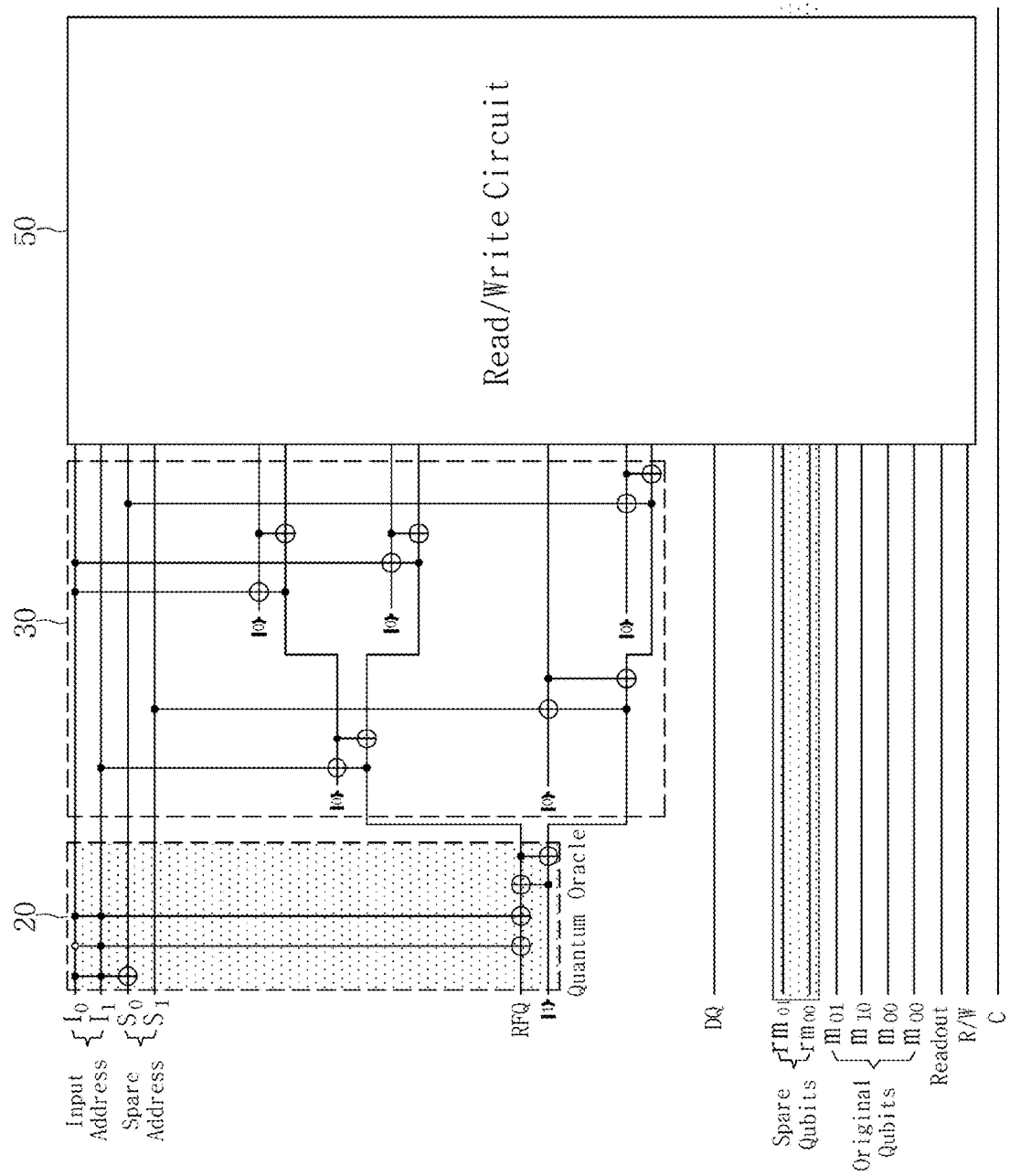
FIG. 4 is a detailed configuration diagram of a built-in-self-repair model (or a redundant repair circuit) and an address routing circuit according to the present disclosure.

FIG. 3 is a detailed configuration diagram of a permanent defect qubit repair system using a built-in-self-repair model at a quantum circuit level according to the present disclosure, and FIG. 4 is a detailed configuration diagram of a built-in-self-repair model (a redundant repair circuit) and an address routing circuit according to the present disclosure.

The redundant repair circuit 20 performs Anti-Controlled-Not and Controlled-Not operations between qubits representing the input address and the SA through the quantum oracle containing information about the FA.

The redundant repair circuit 20 receives an RFQ qubit and a |1> qubit that perform a repair flag function as additional inputs in order to perform a role of an address exchanger.

The state of the RFQ qubit is initialized to |0> and inverted to the state of |1> in order to activate the spare qubit routing circuit, and if the state of the RFQ after the address exchanger is |0>, the original qubit routing circuit is activated.

In addition, both the original qubit routing circuit 30a and the spare qubit routing circuit 30b are composed of circuits that receive the updated memory address as input and route it to the original memory qubit and spare memory qubit, respectively.

Each circuit is a sub-tree structure with RFQ and |1> as the top nodes.

The read/write circuit 50 is associated with the components of Data Qubit (DQ), Readout, R/W, and C, and each component is associated with the qubits constituting the address routing circuit through quantum operations.

DQ is a qubit storing input data, Readout is a qubit for reading values stored in memory, R/W is a qubit determining read and write operations, and C is a bit storing values after measurement.

The read/write circuit 50 performs a role of reading and writing according to the state of R/W, performs memory writing when the value of R/W is |1>, and stores the value stored in DQ in the value of the routed memory cell.

Conversely, if the value of R/W is |0>, it measures the value of the routed memory cell for memory reading through the Readout qubit and transfers the measured value to C.

Figure 5:
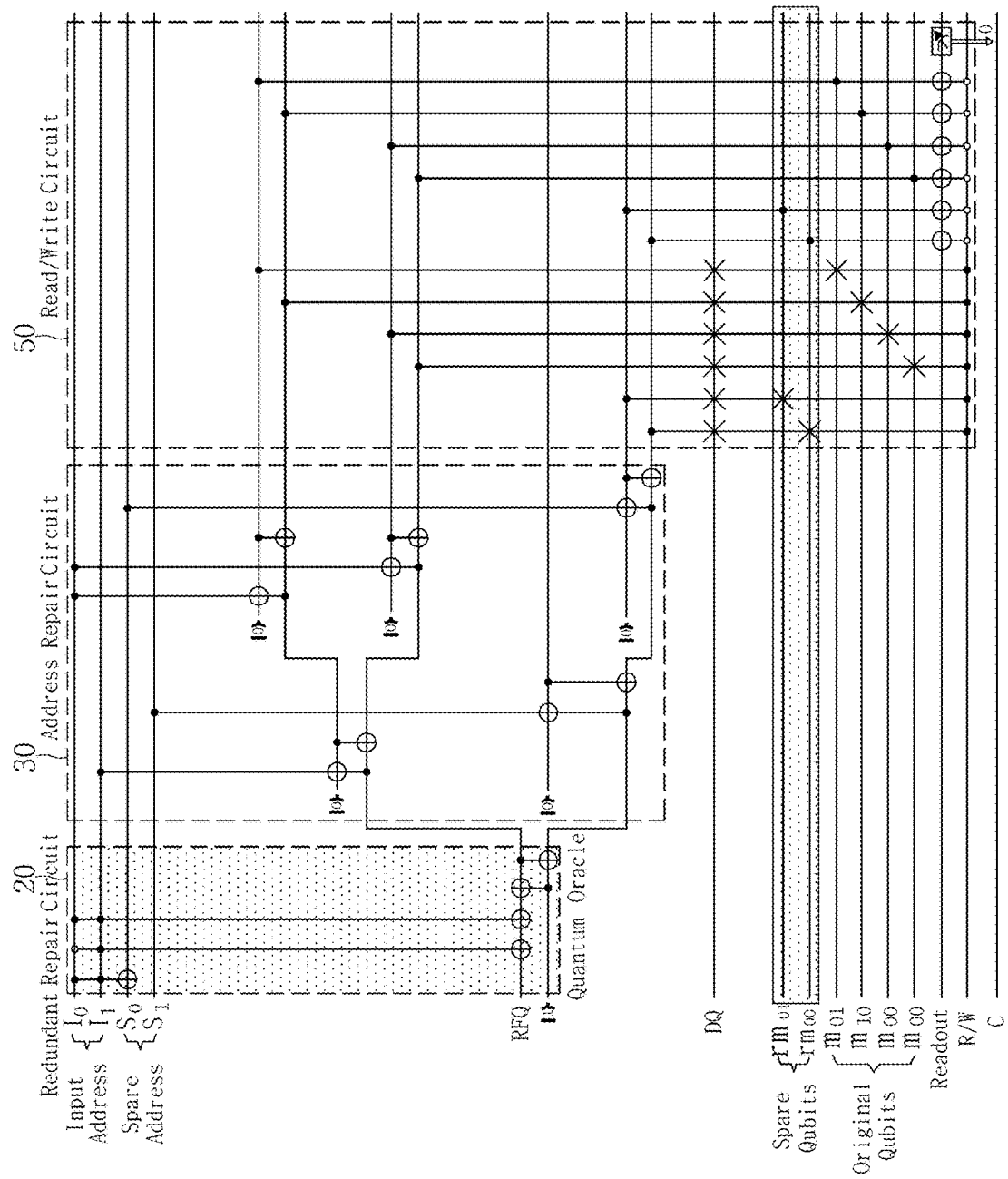
FIG. 5 is a configuration diagram showing an example implemented at a circuit level including all components of a permanent defect qubit repair system when an input address is expressed as three qubits.

FIG. 5 is a configuration diagram showing an example implemented at a circuit level including all components of a permanent defect qubit repair system when an input address is expressed as three qubits.

FIG. 5 shows all of the redundant repair circuit, address routing circuit, and read/write circuit, and specifies all of the qubits used in each part.

Figure 6:
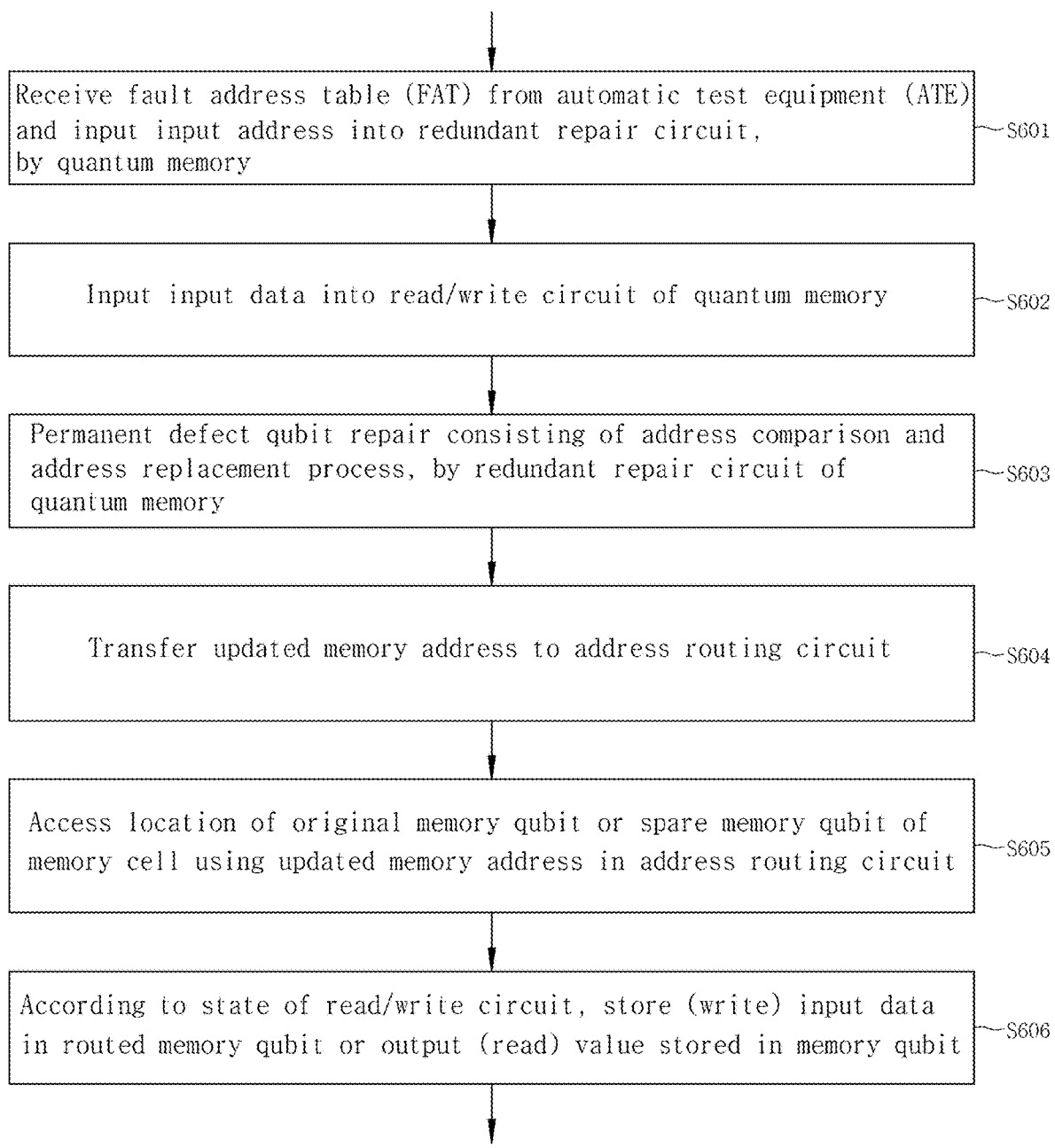
FIG. 6 is a flow chart showing a permanent defect qubit repair method using a built-in-self-repair model at a quantum circuit level according to the present disclosure.

FIG. 6 is a flow chart showing a permanent defect qubit repair method using a built-in-self-repair model at a quantum circuit level according to the present disclosure.

A permanent defect qubit repair method using a built-in-self-repair model at a quantum circuit level according to the present disclosure includes, as shown in FIG. 6, receiving, by a quantum memory, an FAT from ATE and inputting an input address into a built-in-self-repair model (S601), inputting input data into a read/write circuit of the quantum memory (S602), performing permanent defect qubit repair consisting of an address comparison and address replacement process, by the built-in-self-repair model of the quantum memory (S603), transferring an updated memory address to an address routing circuit (S604), accessing a location of an original memory qubit or a spare memory qubit of a memory cell using the updated memory address in the address routing circuit (S605), and according to a state of the read/write circuit, storing (writing) the input data in a routed memory qubit or outputting (reading) a value stored in a memory qubit (S606).

The permanent defect qubit repair system and method using a built-in-self-repair model at a quantum circuit level according to the present disclosure described above is intended to increase quantum memory yield by providing a replacement memory qubit allocation system for permanent defect qubits generated during the quantum memory production process.

The present disclosure allow to significantly reduce overhead in terms of added qubits by performing quantum fault correction by constituting a built-in-self-repair model (quantum oracle) based on FAT information, instead of a quantum fault correction process that requires additional qubits at the same time.

As described above, it will be understood that the present disclosure is implemented in a modified form without departing from the essential characteristics of the present disclosure.

Therefore, the specified embodiments should be considered from an illustrative perspective rather than a restrictive perspective, and the scope of the present disclosure is indicated in the claims rather than the foregoing description, and all differences within the equivalent scope should be construed as being included in the present disclosure.

EXPLANATION OF SYMBOLS

100. Automatic test equipment
200. Quantum memory

What is claimed is:
1. A permanent defect qubit repair system using a redundant repair circuit at a quantum circuit level, comprising:

automatic test equipment configured to provide a fault address table with information of a permanent fault address (FA) and a spare address (SA) for replacing the FA to a quantum memory;
a redundant repair circuit configured to constitute a circuit to repair a permanent defect qubit consisting of an address comparison and address replacement process and transfer an updated memory address to an address routing circuit; and
the quantum memory comprising the address routing circuit configured to receive the updated memory address from the redundant repair circuit and then route the updated memory address to a memory cell according to an address value.

2. The permanent defect qubit repair system of claim 1, wherein the redundant repair circuit comprises an address comparator and an address exchanger supported by a quantum oracle to constitute the circuit to repair the permanent defect qubit consisting of the address comparison and address replacement process, and
the quantum oracle uses FA information and SA information to constitute a relationship with an input address.

3. The permanent defect qubit repair system of claim 1, wherein the quantum memory further comprises a read/write circuit configured to read a value in the memory cell or store a value in the memory cell according to a state of the read/write circuit receiving input data and associated with the memory cell.

4. The permanent defect qubit repair system of claim 1, wherein the memory cell
consists of original memory qubits and spare memory qubits to allow routing to the spare memory qubits if a first input address has been an FA, and
according to a state of a read/write circuit afterwards, values stored in the memory cell are read or input data is stored in the memory cell.

5. The permanent defect qubit repair system of claim 1, wherein the number of addresses of the FA and the number of addresses of the SA for replacing the FA of the fault address table are the same and they correspond 1 to 1.

6. The permanent defect qubit repair system of claim 1, wherein an address comparator of the redundant repair circuit is configured to perform a comparison with the information of the FA reflected in a quantum oracle, and an activation of a repair flag is determined according to a result thereof, and
the repair flag is transferred to an address exchanger, and the address exchanger is configured to update a value of an input address to transfer an address to be routed to the address routing circuit.

7. The permanent defect qubit repair system of claim 1, wherein the address routing circuit has a tree structure, wherein each node consists of qubits, and is divided into a subtree for routing original memory qubits at top of the tree and a subtree for routing spare memory qubits.

8. The permanent defect qubit repair system of claim 2, wherein quantum gates for constituting the quantum oracle for supporting the redundant repair circuit are Controlled-Not and Anti-Controlled-Not gates, and
gate inputs |c> and |t> are a control qubit and a target qubit, respectively.

9. The permanent defect qubit repair system of claim 8, wherein updates at time points a1 and a2 are made according to initial states of the control qubit and the target qubit, and
a Controlled-Not operation inverts a state of the target qubit when a state of the control qubit is |1>, and an Anti-Controlled-Not operation inverts the state of the target qubit when the state of the control qubit is |0>.

10. The permanent defect qubit repair system of claim 9, wherein the redundant repair circuit is configured such that an input address, the FA, and the SA are capable of being associated using the Controlled-Not operation and the Anti-Controlled-Not operation, so that, when the input address is given as input to the memory, the quantum oracle performs a comparison with all FAs by a single circuit execution and outputs a corresponding SA.

11. The permanent defect qubit repair system of claim 10, wherein the redundant repair circuit is configured to receive an RFQ qubit and a |1> qubit that perform a repair flag function as additional inputs in order to perform a role of the address exchanger,
a state of the RFQ qubit is initialized to |0> and inverted to a state of |1> in order to activate a spare qubit routing circuit, and
if the state of the RFQ after the address exchanger is |0>, an original qubit routing circuit is activated.

12. The permanent defect qubit repair system of claim 11, wherein the original qubit routing circuit and the spare qubit routing circuit are both circuits configured to receive the updated memory address as input for routing to the original memory qubit and the spare memory qubit, respectively, and each circuit is a sub-tree structure with RFQ and |1> as top nodes.

13. The permanent defect qubit repair system of claim 3, wherein the read/write circuit is associated through quantum operations between components of Data Qubit (DQ), Readout, R/W, and C, and qubits constituting the address routing circuit, and
wherein DQ is a qubit storing input data, Readout is a qubit for reading values stored in the memory, R/W is a qubit for determining read and write operations, and C is a bit storing a value after measurement.

14. The permanent defect qubit repair system of claim 13, wherein the read/write circuit is configured to perform a role of reading and writing according to a state of R/W, and when a value of R/W is |1>, perform memory writing and store a value stored in DQ in a value of the routed memory cell,
and conversely, when the value of R/W is |0>, measure the value of the routed memory cell for memory reading through the Readout qubit and transfer a measured value to C.

15. A permanent defect qubit repair method using a redundant repair circuit at a quantum circuit level, comprising:
receiving, by a quantum memory, a fault address table (FAT) from automatic test equipment (ATE) and inputting an input address into a redundant repair circuit;
inputting input data into a read/write circuit of the quantum memory;
performing permanent defect qubit repair consisting of an address comparison and address replacement process, by the redundant repair circuit of the quantum memory;
transferring an updated memory address to an address routing circuit;
accessing a location of an original memory qubit or a spare memory qubit of a memory cell using the updated memory address in the address routing circuit; and
according to a state of the read/write circuit, storing the input data in a routed memory qubit or outputting a value stored in a memory qubit.

* * * * *